United States Patent
Rieber et al.

(10) Patent No.: US 6,669,394 B1
(45) Date of Patent: Dec. 30, 2003

(54) SWING ATTACHMENT

(75) Inventors: Frederick M. Rieber, Alum Bank, PA (US); William H. Ziegler, Jr., Bedford, PA (US); Steven Hanson, North Kingstown, RI (US)

(73) Assignee: Hedstrom Corporation, Bedford, PA (US)

( * ) Notice: Subject to any disclaimer, the term of this patent is extended or adjusted under 35 U.S.C. 154(b) by 0 days.

(21) Appl. No.: 10/193,780

(22) Filed: Jul. 12, 2002

(51) Int. Cl.[7] .............................. F16B 1/00; A63G 9/00
(52) U.S. Cl. ..................... 403/164; 403/71; 403/78; 403/26; 472/118
(58) Field of Search .................... 285/24, 61, 419; 403/164, 362, 71, 78, 26, 157, 150, 119; 384/280, 276, 295, 416; 472/118, 119; 474/166

(56) References Cited

U.S. PATENT DOCUMENTS

| 3,411,774 A | * | 11/1968 | Thornton ................ 472/118 X |
| 3,531,077 A |   | 9/1970  | Trottier et al. |
| 4,036,789 A | * | 7/1977  | Shim ........................... 521/169 |
| 4,852,913 A | * | 8/1989  | Brooks ................... 285/419 X |
| 4,930,910 A | * | 6/1990  | Mori et al. ................. 384/276 |
| 5,529,539 A | * | 6/1996  | Hoffman ..................... 472/118 |
| 6,123,480 A |   | 9/2000  | Petty et al. |

\* cited by examiner

Primary Examiner—John R. Cottingham
(74) Attorney, Agent, or Firm—Cesari and McKenna, LLP

(57) ABSTRACT

An attachment for attaching the upper end of a swing device to a raised top bar. The attachment includes a pair of arcuate slide sections having opposite ends in mating engagement to form a circular slide, a U-bolt having a pair of parallel threaded end segments connected by a curved bridging portion slidably engaged in the slide, a generally V-shaped saddle bracket whose arms have first ends connected by a saddle, spaced-apart second ends containing through holes for receiving the end segments of the U-bolt and a pair of opposing sliders projecting from the bracket arms for slidably engaging in the slide, and at least one nut for threadedly engaging an end segment of the U-bolt. The attachment enables a chain or other swing suspension device that is secured to the bracket to pivot 360° around the top bar.

9 Claims, 1 Drawing Sheet

SWING ATTACHMENT

BACKGROUND OF THE INVENTION

This invention relates to a children's swing set. It relates especially to a device for pivotally attaching a swing or similar device to the top bar of a swing set.

Children's swings, glide rides and the like usually include some kind of a seating platform suspended by suspension means such as chains, cables, tubes or the like from a top bar or other raised horizontal support. The suspension means are invariably connected to the top bar or other raised support by pivots. In one known example, a pair of eye bolts are mounted at spaced-apart locations along the top bar and the uppermost links of a pair of chains supporting the swing seat are connected to the eye bolts by S-hooks. When the swing seat swings back and forth, the S-hooks pivot relative to the eye bolts. That type of connection is disadvantaged in that it does not allow the chains or other suspension means to pivot completely over the top bar.

There do exist bearing assemblies for swing sets which do allow a chain or other suspension means to pivot completely over the top bar; see e.g. U.S. Pat. Nos. 3,531,077 and 6,123,480. However those bearing assemblies are relatively complicated devices consisting of several separate parts which must be assembled using a multiplicity of small fasteners. Considering the fact that most present day swing sets are sold in a knock-down condition for assembly by the ultimate purchaser, it is not surprising that those small parts are often misplaced or lost entirely. At the very least, the required installation of all those parts prolongs the time its takes to assemble the swing set.

SUMMARY OF THE INVENTION

Accordingly, the present invention aims to provide a swing attachment in the form of a bearing assembly for pivotally attaching a swing-type ride to a top bar or other raised horizontal support.

A further object of the invention is to provide a swing attachment of this type which is relatively easy and inexpensive to manufacture.

Yet another object of the invention is to provide such a swing attachment which is composed of a minimum number of parts that can be assembled easily without requiring any special tools.

A further object of the invention is to provide a swing attachment of this type which allows the chain or other seat suspension means to pivot completely around the top bar or other overhead horizontal support.

Yet another object of the invention is to provide a swing attachment which requires only two fastening elements in order to pivotally connect the upper end of a chain or other suspension means to the top bar of a swing set.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, our attachment attaches the upper end of a swing device to a raised top bar or other overhead horizontal support. The attachment comprises a pair of similar arcuate slide sections, each slide section having first and second ends and opposite inner and outer walls extending between those ends. The slide sections are shaped and dimensioned so that when the slide sections are juxtaposed with their corresponding ends in butting engagement, the inner walls of the slide sections define an opening corresponding the cross-section of the top bar. There are semi-circular grooves in the outer walls of the slide sections which when the slide sections are juxtaposed and butted define a substantially continuous circular slide or track.

The attachment also includes a fastening means for clamping the slide sections to the top bar, yet which are slidable along the slide so that the fastening means (and a chain or other suspension device attached thereto) can execute a 360° rotation about the top bar. Typically, the fastening means may include a U-bolt having a pair of substantially parallel legs connected by a bridging portion having a curvature corresponding to the curvature of the slide and a bracket including a pair of arms having corresponding first ends connected by a saddle portion and corresponding spaced-apart co-planar second ends. Through holes are formed in those second ends which are so spaced-apart and sized as to receive the end segments of the U-bolt. A pair of opposing sliders may project from the bracket arms near the second ends thereof, each slider being slidably received in the slide when the bracket is engaged against the slide sections and the end segments of the U-bolt extend through said holes. Means are provided at the ends of the U-bolt legs projecting through the bracket so as to clamp the slide sections between the U-bolt and the bracket.

When the upper end of a chain or other swing suspension device is engaged on the bracket, the attachment allows that end to pivot a full 360° about the axis of the top bar.

BRIEF DESCRIPTION OF THE DRAWINGS

For a fuller understanding of the nature and objects of the invention, reference should be made to the following detailed description taken in connection with the accompanied drawings, in which.

DESCRIPTION OF THE A PREFERRED EMBODIMENT

Figure 1:
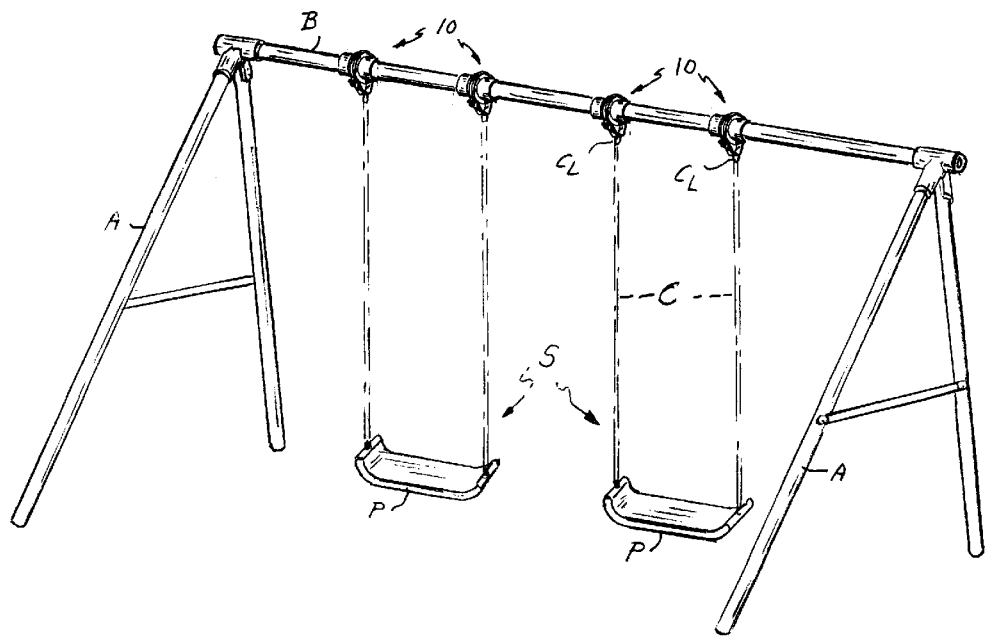
FIG. 1 is a perspective view of a children's swing set incorporating swing attachments according to the invention.

Refer now to FIG. 1 of the drawings which shows a children's swing set including a top bar B supported at opposite ends by conventional A-frames A. Suspended from top bar B is a pair of swings shown generally at S. Each swing includes a seating platform P suspended from top bar B by chains C whose uppermost links $C_L$ are pivotally connected to top bar B by attachments shown generally at 10. The seating platform P could, of course, be suspended from top bar B or other overhead support by other suspension means such as flexible cables, rigid rods or tubes and the like.

Figure 2:
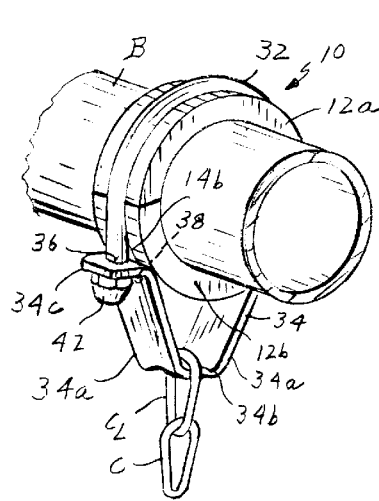
FIG. 2 is a fragmentary perspective view on a much larger scale showing one of the swing attachments in FIG. 1.
Figure 3:
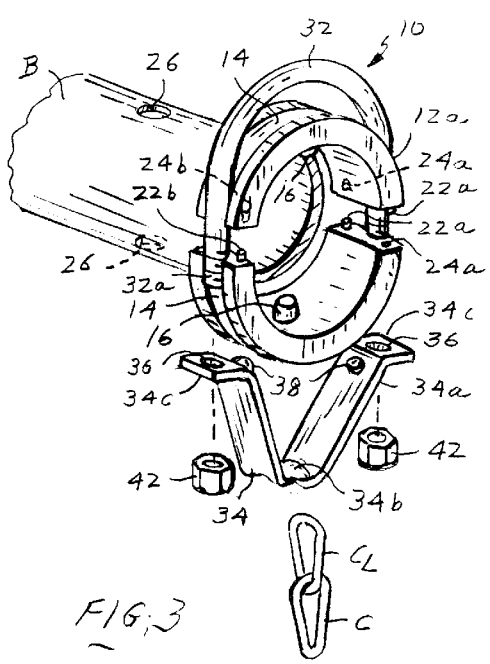
FIG. 3 is an exploded perspective view showing the components of the FIG. 2 attachment in their disassembled condition.

Referring now to FIGS. 2 and 3, each attachment 10 includes a set of upper and lower arcuate slide sections 12a and 12b made of a suitable rigid, weather-resistant, low friction plastic material, e.g. nylon or high molecular weight polyethylene. The illustrated slide sections are semi-circular with an inner diameter that corresponds to that of the tubular top bar B. Each slide section has a peripheral groove or slide 14 and a radially inwardly extending post 16 more or less midway along its length. Also, an integral key 22a and an adjacent keyhole 24a are present at one end of each slide section 12a, 12b and a similar key 22b and keyhole 24b are present at the other end of each section 12a, 12b. Resultantly, when the two slide sections are juxtaposed opposite one another as shown in FIG. 3, at opposing first ends of the two sections, the keys 22a are disposed opposite the keyholes 24a, while at the opposing second ends of the two sections, the key 22b are disposed opposite the keyholes 24b.

In use, the two slide sections 12a, 12b are adapted to be clamped to opposite sides of the top bar B with the posts 16 projecting into a pair of diametrically opposite holes 26, 26 formed in the top bar. When the two sections are properly seated against the top bar as shown in FIG. 2, the keys 22a, 22b at the ends of the two sections project into the corresponding keyholes 24a, 24b therein and the posts 16 project through holes 26, 26 in the top bar. Thus, the two sections 12a, 12b are fixed relative to one another and are fixed relative to top bar B, with the slides 14 of the two track sections forming a substantially continuous circular groove or track that extends completely around the longitudinal axis of the top bar.

The third major component of attachment 10 is a fastener element, namely a double-ended U-bolt 32, e.g., formed of $\frac{3}{16}$ inch steel wire, whose curvature corresponds to that of slides 14, 14 so that the bolt can be slidably seated in the slides 14, 14 of the assembled slide sections 12a, 12b as shown in FIG. 2. One end segment 32a of the U-bolt is bent out at a right angle; the other end segment 32b is threaded. When the U-bolt 32 is installed on the top bar, the end segments 32a and 32b are on opposite sides of the top bar B.

The fourth major component of attachment 10 is a saddle bracket 34 formed from a relatively rigid metal strap. The illustrated bracket 34 has a pair of legs 34a, 34a which converge to a lower curved wall or saddle portion 34b so as to form a V-shape. The legs 34a, 34a have spaced-apart upper end segments 34c and 34d, respectively, which are turned away from one another. Segment 34c has a through hole 35 and a raised channel 36 extending out from hole 35 perpendicular to leg 34a so that the end segment 32a of U-bolt 32 can be inserted through hole 35 and hooked under the bracket segment 34c so it engages in channel 36 as shown in FIG. 2. The other bracket end segment 34d has a hole 37 to receive the threaded end segment 32b of bolt 32.

In addition, a pair of opposing rounded bosses constituting projecting sliders 38 are present near the upper ends of bracket legs 34a, 34a just below segments 34c and 34d thereof. Each slider 38 extends more or less perpendicular to the associated leg 34a so that when bracket 34 is engaged against the underside of a slide section 12a, 12b as shown in FIG. 2, the sliders 38 will extend into the slide 14 of that section, while at the same time, the bracket end segments 34c and 34d will be more or less horizontal so that the ends of bolt 32 can extend down through the holes 35 and 37 in the end bracket segments 34c and 34d, respectively.

Prior to engaging the bracket to the bolt, however, the uppermost link $C_L$ of chain C is secured to bracket 34 by threading one end of the bracket 34 through the eye of the link $C_L$ so that that link seats on the bracket lower wall or saddle portion 34b. Then, after the threaded end segment 32b of the bolt 32 is inserted through the hole 37 in the bracket; it may be retained there by a fastening element in the form of a nut 42 threaded onto the bolt segment 32b extending under bracket end segment 34d. Preferably, the nut 42 is of the friction type so that once tightened onto the end of the bolt, it will remain in place unless removed intentionally by a wrench or similar tool.

When the components of the attachment are assembled as shown in FIG. 2, the bolt 32 and bracket 34 are free to rotate as a unit in the circular track defined by slides 14, 14 a full 360° relative to the common axis of slide sections 12a, 12b and top bar B. Thus, the upper end of chain C can pivot completely around the top bar while being fixed to the top bar in the axial direction.

It is the feature of the invention that when the four major components of the attachment 10 are secured using the single nut 42, slide sections 12a, 12b are fixed to the top bar B both rotationally and axially, the bolt 32/bracket 34 combination is axially fixed but rotatable relative to the slide sections and the upper link $C_L$ of the chain C is fixed to the bracket, thereby providing a bearing attachment that allows the chain C to pivot completely over the top bar B. Yet, attachment 10 comprises a minimum number of parts which are easily assembled to the top bar of a swing set using only one nut, thereby minimizing the likelihood of fastener loss that would prevent convenient assembly of the attachment by a purchaser to the top bar of the purchaser's swing set.

Since the slide sections are molded plastic parts which can be made in quantity relatively inexpensively and bolt 32 is a formed wire and bracket 34 is a formed metal part, and nut 42 is a conventional off-the-shelf item, the entire assembly can be made at minimum cost. Therefore, it should find wide acceptance in the marketplace.

It will thus be seen that the objects set forth above among those made apparent from the preceding description are efficiently attained. Also, certain changes may be made in the above construction without departing from the scope of the invention. Thus, slide sections 12a and 12b may have other shapes depending upon the cross-sectional shape of top bar B. For example if the top bar B has a square cross-section, the inner walls of the arcuate sections 12a, 12b should complete a square. The only requirement is that the outer grooves 14, 14 of the two slide sections complete a circle so that the connected-together bolt 32 and bracket 34 can pivot completely over or around the sections and top bar B. Also, of course, in lieu of U-bolt 32 and saddle bracket 34, other fastening means may be used to rotatably secure the chain link $C_L$ to the slide sections 12a, 12b. The only requirement in that respect is the fastening means in toto must be able to slide along the slides 14 in the slide sections 12a, 12b. Therefore, it is intended that all matter contained in the above description or shown in the accompanying drawings shall be interpreted as illustrative and not in a limiting sense.

We claim:

1. An attachment for attaching the upper end of a swing device to a raised top bar, said attachment comprising
   a pair of similar arcuate slide sections, each slide section having
      first and second ends;
      opposite inner and outer walls extending between said ends, said walls being shaped and dimensioned so that when the slide sections are juxtaposed with their corresponding ends in butting engagement, the inner walls of the slide sections define an opening corresponding the cross-section of the top bar, and
      a peripheral semi-circular groove in the outer wall of each slide section which when the slide sections are juxtaposed and butted define a substantially continuous circular slide having an axis, and fastening means for clamping said slide sections to the top bar, said fastening being slidable along said circular slide at least 360° about said axis said fastening means comprising, a U-bolt having a pair of substantially parallel legs connected by a bridging portion having a curvature corresponding to the curvature of said slide;

a bracket including a pair of arms having corresponding first ends connected by a saddle portion and corresponding spaced-apart second ends having corresponding through holes which are so spaced-apart and sized as to receive the legs of the U-bolt, and a pair of opposing sliders projecting from said arms near the second ends thereof, each slider being slidably received in said slide when the bracket is engaged against the slide sections and the legs of the U-bolt extend through said holes, and at least one nut threadedly engaging a leg of the U-bolts so as to clamp the slide sections between the U-bolt and the saddle bracket.

2. The attachment defined in claim 1 wherein said bracket is V-shaped.

3. The attachment defined in claim 1 wherein the slide sections are semi-circular.

4. The attachment defined in claim 3 and further including keying means at the first and second ends of each slide section which interfit when the corresponding ends of the slide sections are in butting engagement.

5. The attachment defined in claim 1 and further including interfitting means on the inner surface of each slide section for interfitting with a top bar.

6. The attachment defined in claim 1 and further including swing suspension means including an eye, said bracket being threaded through said eye so that the suspension means seat on said saddle portion.

7. An attachment for attaching a swing device to an elevated horizontal, cylindrical, support having a longitudinal axis and a selected diameter, said attachment comprising a pair of semi-circular slide sections engaged around the support, said slide sections having opposite ends in mating engagement to form an exterior circular slide, and posts projecting into the support to prevent movement of the slide sections relative to the support, and fastening means clamping said slide sections together in mating engagement about said support said fastening means being slidable along said slide at least 360° about said axis said fastening means comprising a U-bolt comprising a pair of substantially parallel legs connected at corresponding first ends by a curved bridging portion slidably engaged in said slide, said legs also having corresponding spaced-apart second ends, a bracket including a pair of arms having corresponding first ends connected by a saddle and corresponding spaced-apart, second ends, said second ends containing through holes spaced-apart and sized to receive the legs of the U-bolt, and a pair of opposing sliders projecting from said bracket arms between the ends thereof and slidably engaged in 9 said slide, and securing means on the second ends of the U-bolt legs under the second ends of the bracket arms for clamping the slide sections together around the support between the U-bolt and the bracket.

8. The attachment defined in claim 6 and further including a swing suspension member having an end seated on said saddle.

9. The attachment defined in claim 6 wherein the securing means comprise a hook on the second end of the U-bolt legs hooked under the second end of one bracket arm, and a nut threaded onto the second end of the other U-bolt leg under the second end of the other bracket arm.

\* \* \* \* \*